Jan. 19, 1926.  
W. CHAMPION  
COMPASS  
Filed Feb. 4, 1924
1,570,459
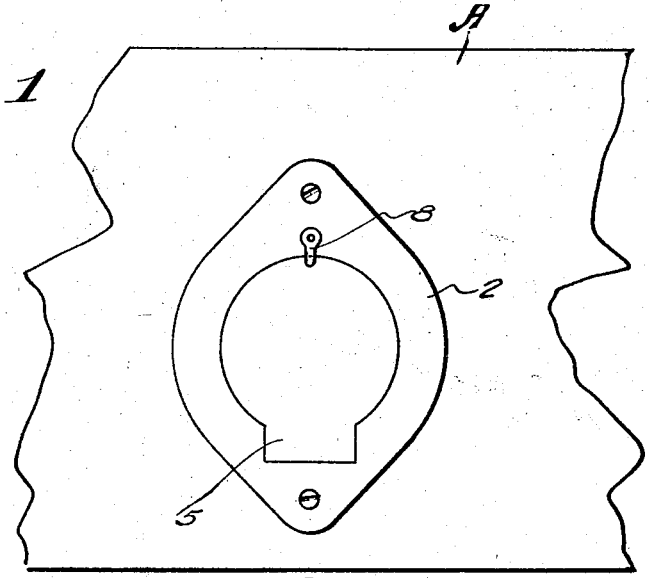
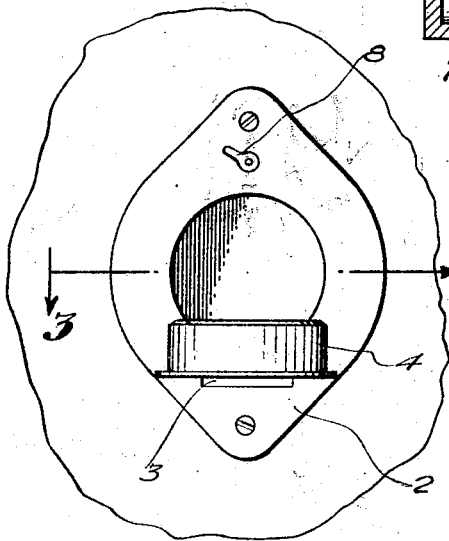
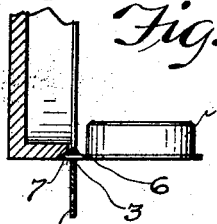
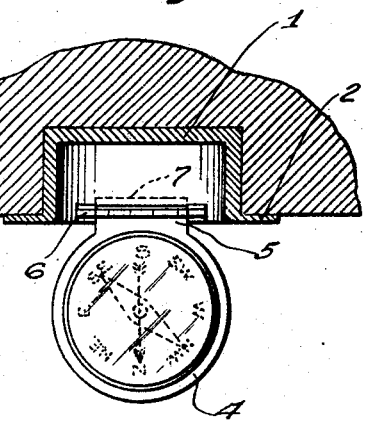
W. CHAMPION  
INVENTOR
BY Victor J. Evans  
ATTORNEY
WITNESS:

Patented Jan. 19, 1926.

1,570,459

UNITED STATES PATENT OFFICE.

WARREN CHAMPION, OF PEKIN, ILLINOIS.

COMPASS.

Application filed February 4, 1924. Serial No. 690,574.

*To all whom it may concern:*

Be it known that I, WARREN CHAMPION, a citizen of the United States, residing at Pekin, in the county of Tazewell and State of Illinois, have invented new and useful Improvements in Compasses, of which the following is a specification.

This invention relates to a compass and has for its primary object the construction and association of a compass whereby the device may be immediately arranged in place and the compass structure readily thrown to horizontal position for ready observation.

An object of the invention is the novel manner of housing the compass when not in use so as to fully protect same.

Besides the above my invention is distinguished in the novel construction of hinged connection between the compass structure and casing so that the compass structure will be accurately supported in horizontal position so as to assure accurate operation of the compass.

With these and other objects in view the invention will be better understood from the following detailed description taken in connection with the accompanying drawing wherein:

Fig. 1 is a front elevation of the device.

Fig. 2 is a similar view showing the compass structure in horizontal position.

Fig. 3 is a sectional view on the line 3—3 of Fig. 2.

Fig. 4 is a detail sectional view illustrating the hinge structure.

Referring more particularly to the drawings the device is shown as attached to dash board A of a motor vehicle and includes a casing 1 having projecting therefrom a rim 2 for attachment to the dash board. It will be noted that at the point of juncture of the rim with the casing 1 I arrange a slot 3 for the purpose hereinafter described. The compass structure 4 of well known design has a flange 5 projecting therefrom which is hinged to the casing as indicated at 6. A lip 7, a continuation of the flange 5, is so arranged that when the compass structure is moved outwardly from the casing 1 the lip 7 will engage the under surface of the casing to limit the movement of the compass structure to a horizontal position thereby positioning the compass structure so as to be easily observed and besides to assure proper operation of the compass needle.

To complete the invention I provide the clip 8 for holding the compass structure within the casing when not in use and owing to the arrangement of parts will be seen the compass structure is effectively held in position against breakage.

It is, of course, to be understood that the invention may be constructed in various other manners and the parts associated in different relations, therefore, I do not desire to be limited in any manner except as set forth in the claim hereunto appended.

Having thus described my invention what I claim is:

In combination, a casing having a flange projecting therefrom and a slot arranged at the juncture of the flange with the casing, a compass structure, a flange projecting from the compass structure and hinged to the casing flange, a lip formed on the end of the flange of the compass structure and movable through said slot whereby to engage one side of the casing to limit the movement of the compass structure to a horizontal position.

In testimony whereof I affix my signature.

WARREN CHAMPION.